US012810740B2

(12) United States Patent
Gepner

(10) Patent No.: US 12,810,740 B2
(45) Date of Patent: Nov. 24, 2026

(54) HEADS-UP DISPLAY SYSTEM WITH IMAGE ADJUSTMENT

(71) Applicant: Garmin International, Inc., Olathe, KS (US)

(72) Inventor: Joseph E. Gepner, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 0 days.

(21) Appl. No.: 18/905,617

(22) Filed: Oct. 3, 2024

(65) Prior Publication Data

US 2026/0100133 A1 Apr. 9, 2026

(51) Int. Cl.

| | |
|---|---|
| ***G09G 5/00*** | (2006.01) |
| ***B64D 43/02*** | (2006.01) |
| ***G01C 23/00*** | (2006.01) |
| ***G02B 27/01*** | (2006.01) |
| ***G08G 5/21*** | (2025.01) |
| ***G08G 5/54*** | (2025.01) |

(52) U.S. Cl.

CPC ............... *G08G 5/54* (2025.01); *B64D 43/02* (2013.01); *G01C 23/005* (2013.01); *G02B 27/0101* (2013.01); *G08G 5/21* (2025.01); *G02B 2027/0138* (2013.01); *G02B 2027/014* (2013.01)

(58) Field of Classification Search

CPC . G08G 5/54; G08G 5/21; B64D 43/02; G01C 23/005

USPC .............................................................. 345/7

See application file for complete search history.

(56) References Cited

U.S. PATENT DOCUMENTS

| | | | |
|---|---|---|---|
| 6,343,863 B1 * | 2/2002 | Wood ..................... | G03B 21/00 353/13 |
| 9,284,045 B1 | 3/2016 | Springer et al. | |
| 2007/0019297 A1 * | 1/2007 | Stewart .............. | G02B 27/0149 359/630 |
| 2010/0207026 A1 * | 8/2010 | Kerr ....................... | B64D 43/00 250/330 |
| 2010/0231705 A1 * | 9/2010 | Yahav ...................... | G08G 5/21 348/E7.091 |
| 2016/0377862 A1 * | 12/2016 | Zimmerman ........ | G02B 6/0011 359/633 |
| 2020/0378791 A1 * | 12/2020 | Hausmann ................ | G06T 7/73 |
| 2021/0173480 A1 * | 6/2021 | Osterhout ........... | G06F 3/04815 |

(Continued)

OTHER PUBLICATIONS https://www.youtube.com/watch?v=TKQvXNySVj0, accessible prior to Oct. 3, 2024.

(Continued)

*Primary Examiner* — Jonathan M Blancha

(74) *Attorney, Agent, or Firm* — Samuel M. Korte; Kathleen D. Fitterling

(57) ABSTRACT

A heads-up display (HUD) system includes an overhead unit and a HUD computer. The overhead unit may include a combiner, a projector, and a camera operable to generate an environment image external to the aircraft containing the HUD system. The HUD computer is coupled with the overhead unit and comprises a processing system. The processing system is operable to acquire the external environment image from the camera, identify a runway characteristic in the environment image, utilize the runway characteristic to determine a placement location for a HUD image, and cause the projector to display the HUD image at the determined placement location.

7 Claims, 6 Drawing Sheets

(56) References Cited

U.S. PATENT DOCUMENTS

| | | | | |
|---|---|---|---|---|
| 2021/0199976 | A1* | 7/2021 | Harris | G02B 27/0176 |
| 2023/0023069 | A1* | 1/2023 | Gariel | G06T 7/74 |
| 2023/0192312 | A1* | 6/2023 | Berger | B64D 43/02<br>701/16 |

OTHER PUBLICATIONS

Rockwell Collins HGS-3500 brochure, accessible prior to Oct. 3, 2024.

Rockwell Collins HGS-6000 brochure, accessible prior to Oct. 3, 2024.

* cited by examiner

HEADS-UP DISPLAY SYSTEM WITH IMAGE ADJUSTMENT

BACKGROUND

Heads-up display (HUD) systems in aircraft provide pilots with flight information projected onto a screen in their line of sight, allowing them to monitor data without looking away from their external view. These systems are typically integrated with the aircraft's internal navigation systems to ensure precise alignment between the displayed data and the pilot's external view. This calibration requires the use of sophisticated and often costly navigation technologies to maintain accuracy during various phases of flight.

BRIEF DESCRIPTION OF THE DRAWINGS

Embodiments of the present invention are described in detail below with reference to the attached drawing figures, wherein.

Figure 1:
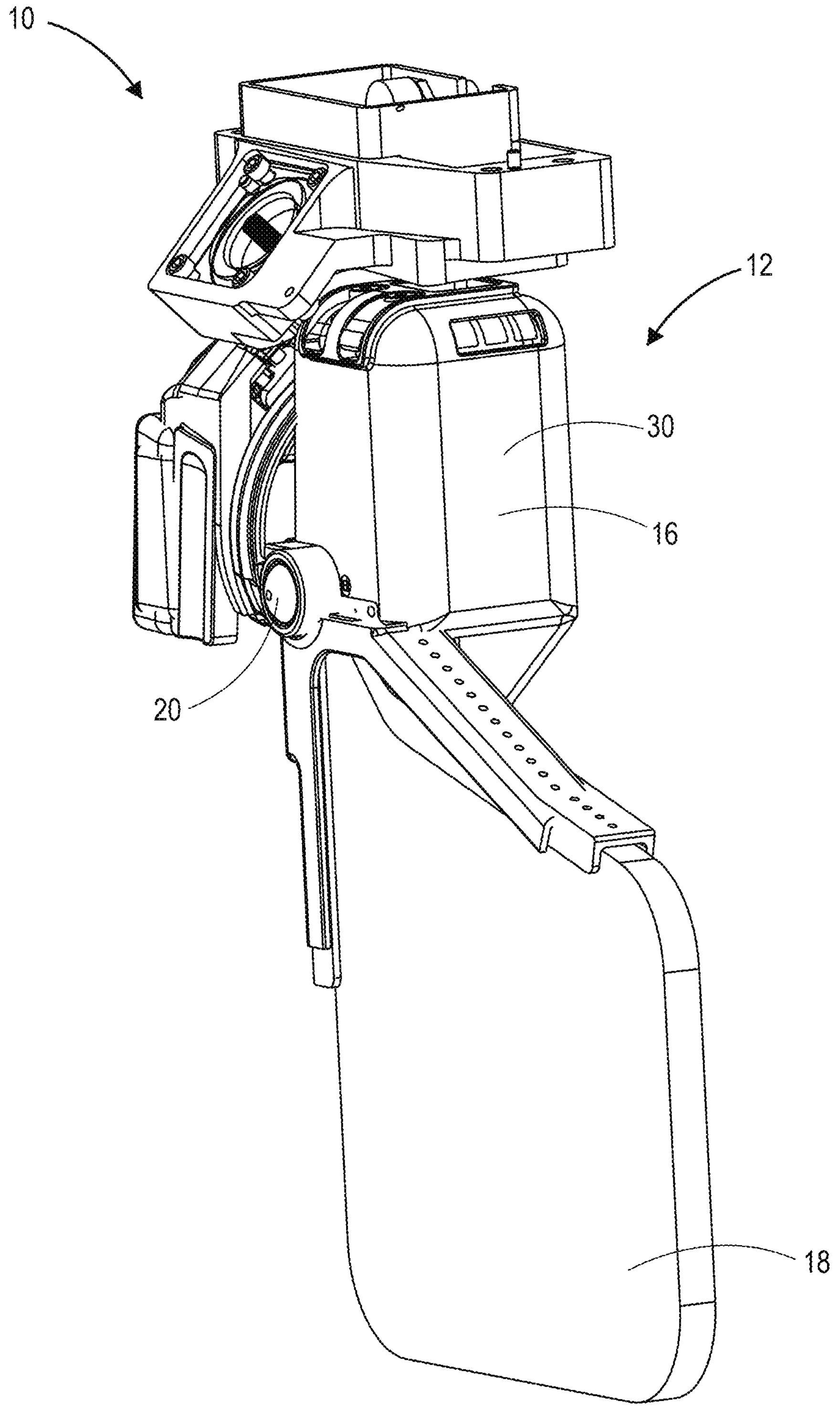
FIG. 1 is a perspective view of a HUD system including an overhead unit configured according to various embodiments of the present invention.

The figures are not intended to limit the present invention to the specific embodiments they depict. While the drawings do not necessarily provide exact dimensions or tolerances for the illustrated structures or components, the drawings are to scale with respect to the relationships between the components of the structures illustrated in the drawings.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Heads-up display (HUD) systems must typically rely on expensive equipment, such as precision compasses and advanced heading reference systems, to ensure that the images they project accurately correspond to the real-world environment outside the aircraft. These systems require precise calibration to maintain alignment between the HUD's display and the pilot's view, especially for critical flight data like altitude, heading, and attitude. The need for high-accuracy instruments, including integrated systems like AHRS, drives up the overall cost of HUD installations. As a result, the expense of such equipment limits the adoption of HUD systems in certain aircraft. Misalignment of HUD images with the real-world view of the pilot reduces the usefulness of HUD systems.

Referring to FIGS. 1-7, embodiments of the present invention provide a HUD system 10 that may include an overhead unit 12 and a HUD computer 14. The overhead unit 12 can include a projector 16, a combiner 18, and camera 20. The HUD computer 14 can include a processing system 22. As explained in more detail below, the processing system 22 can utilize images generated by the camera 20 to accurately position images for display by the overhead unit 12 on combiner 18. Use of the camera 20 and the techniques described herein can allow the HUD system 10 to be deployed in categories of aircraft that may lack expensive heading, attitude, and/or inertial navigation systems.

Figure 6:
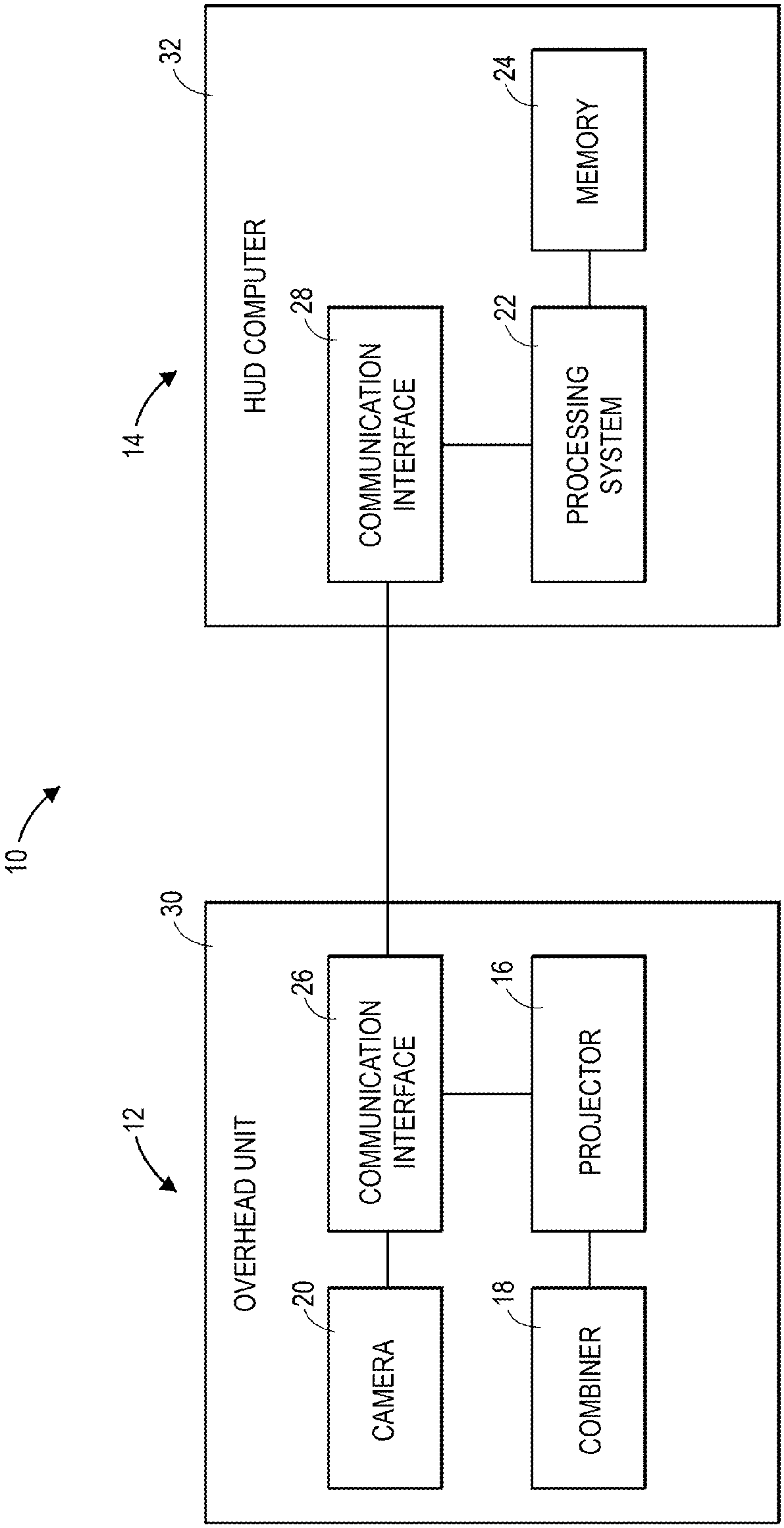
FIG. 6 is a block diagram of the HUD system of FIGS. 1-4.

Referring to FIGS. 1 and 6, overhead unit 12 is illustrated including the projector 16, combiner 18, and camera 20. HUD overhead unit 12 is configured to receive data from processing system 22 of the HUD computer 14. Upon receiving this data, HUD overhead unit 12 can utilize the projector 16 to display HUD images corresponding to flight information or navigational data, as explained in more detail below. The projector 16 then projects these HUD images onto the combiner 18, which reflects the display into the pilot's line of sight while allowing the pilot to maintain a view of the external environment.

The combiner 18 can be made of a transparent material, such as specially coated glass or polycarbonate, that allows it to both reflect and transmit light. Its primary function is to reflect the images projected by the projector 16 into the pilot's line of sight, while also allowing the pilot to see through it to the external environment. The reflective coating on the combiner 18 is designed to reflect only the specific wavelengths of light used by the projector, ensuring that the displayed information is clearly visible. At the same time, the transparency of the combiner allows it to remain unobtrusive, so the pilot can simultaneously view the outside world.

The projector 16 can include various light sources and lenses to generate visual content for projection onto and/or into combiner 18. The light sources may include LEDs, laser diodes, high-intensity lamps, LCD, OLED, and/or microLED components chosen for their brightness, efficiency, and ability to operate reliably in varying cockpit environments. These light sources emit beams of light that can be directed through one or more optical lenses. The lenses can include collimating lenses, which focus the light into parallel rays, and magnifying lenses, which ensure that the projected images are the correct size and sharpness when displayed on the combiner 18. The lenses also help to correct any distortions or aberrations in the optical signals generated by projector 16.

Overhead unit 12 may include a housing 30 designed to retain and position both the projector 16 and the combiner 18 within the aircraft cockpit. The housing 30 can be constructed to securely hold these components in precise alignment to ensure that the projected images from the projector 16 are accurately displayed on the combiner 18. Additionally, housing 30 may feature movable or pivoting joints, allowing the combiner 18 to be adjusted as needed. These pivoting joints enable the combiner 18 to be rotated or moved in and out of the pilot's view. This functionality allows the pilot to adjust the combiner's position based on specific flight conditions or personal preferences, retracting it when not in use or adjusting its angle for optimal viewing.

Overhead unit 12 additionally includes camera 20, which can be used to capture images of the aircraft's external environment. Various types of cameras can be employed for this purpose, depending on the specific requirements of the HUD system. Charge-Coupled Device (CCD) cameras are one example that can be used due to their high sensitivity to light and ability to produce clear, high-resolution images, even in low-light conditions. Complementary Metal-Oxide-Semiconductor (CMOS) cameras are another example, offering lower power consumption and faster image processing compared to CCD cameras, while still providing high-quality images. Infrared (IR) cameras may also be utilized, particularly in environments where visibility is poor, such as during night operations or in adverse weather conditions. Camera 20 can include one or more cameras configured to capture images of the same or different portions of the aircraft's exterior. For example, utilizing several cameras 20, stereoscopic or 3D images can be generated for use by processing system 22. Additionally or alternatively, panoramic or composite images from multiple camera sources can be used to capture a broader region for analysis by processing system 22. In some cases, multispectral or hyperspectral cameras may be integrated to capture a broader range of light wavelengths.

Figure 2:
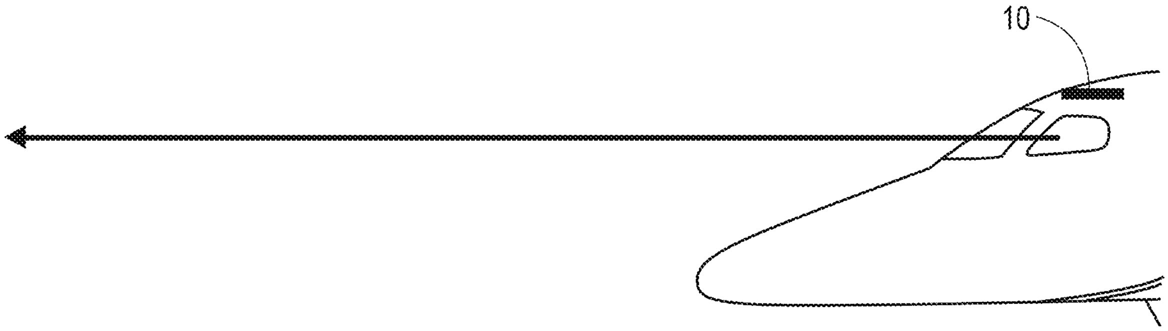
FIG. 2 is a diagram of the HUD system of FIG. 1 installed within an exemplary aircraft.

In configurations, camera 20 is positioned on housing 30 to enable the camera 20 to capture images corresponding to the pilot's view, for example, looking out the windscreen of the aircraft as shown in FIG. 2. This configuration allows the HUD system 10 to be easily installed in various aircraft types without requiring the separate installation of camera systems. However, in some configurations, camera 20 is not retained by housing 30 and can be positioned elsewhere within, or on, the aircraft to provide the functionality described herein.

Overhead unit 12 may additionally include a communication interface 26 to enable the overhead unit 12 to communicate with HUD computer 14 and/or other components of the system 10. Communication interface 26 may also enable the overhead unit 12 to communicate with the integrated avionics system 100 described below. In various embodiments, the communication interface 26 may include wired or wireless data buses suitable for conveying data and/or image information, such as HDMI, Ethernet, ARINC 429, MIL-STD-1553, or wireless protocols like Wi-Fi or Bluetooth.

The processing system 22 of HUD computer 14 may include various processing and computing elements such as microprocessors, microcontrollers, field-programmable gate arrays (FPGAs), digital signal processors (DSPs), application-specific integrated circuits (ASICs), or general-purpose processors. Processing system 22 may be coupled with memory 24 to store and retrieve data corresponding to operation of the system 10. Memory 24 may include random-access memory (RAM), read-only memory (ROM), flash memory, or other non-volatile storage. These memory types allow for temporary storage of real-time data, such as sensor inputs or flight parameters, as well as permanent storage of system configuration, operational software, and calibration settings.

Figure 5:
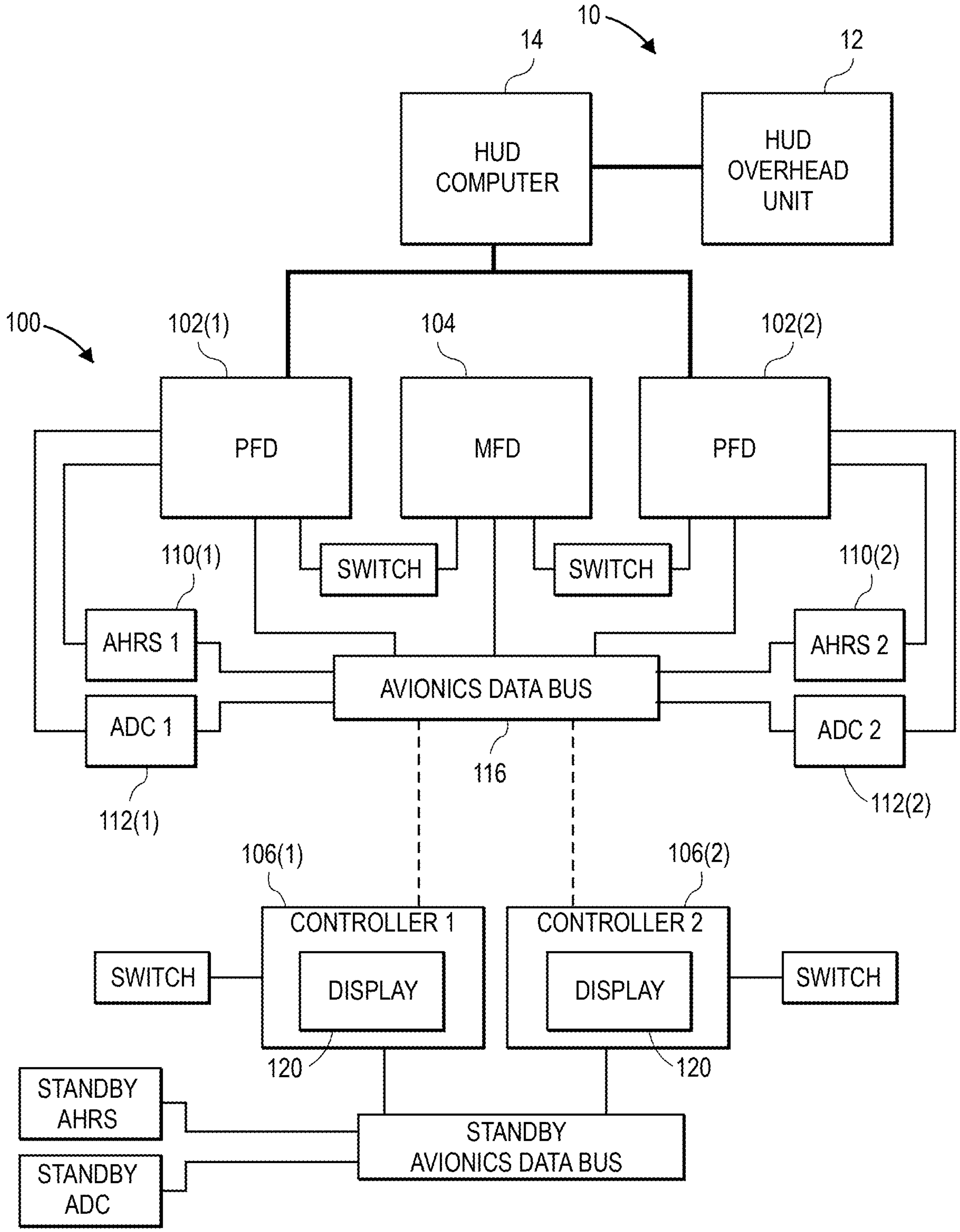
FIG. 5 is a block diagram of the HUD system of FIGS. 1-4 interfaced with an integrated avionics system.

HUD computer 14 may include communication interface 28, similar to communication interface 26 of overhead unit 12, to enable the HUD computer 14 to communicate with overhead unit 12 to control the display of images by the system 10. Communication interface 28 may support various communication protocols, such as Ethernet, ARINC 429, or MIL-STD-1553, allowing for the efficient transfer of flight data, image information, and control signals. In the example of FIG. 5, overhead unit 12 is configured to communicate directly with HUD computer 14, while HUD computer 14 is configured to also communicate with various elements of the integrated avionics system 100.

HUD computer 14 may include housing 32 to retain various components of the HUD computer 14. In some examples, the housing 32 of HUD computer 14 is separate from the housing 30 of the overhead unit 12, to minimize the size of the overhead unit 12 and allow the HUD computer 14 to be positioned elsewhere within the aircraft. However, in some examples, housing 32 and housing 30 form a common housing and an integrated system to further simplify the installation of HUD system 100 process.

FIG. 5 illustrates an example configuration of the integrated avionics system that may be utilized in combination with HUD system 10. In some embodiments, the integrated avionics system 100 may include one or more primary flight displays (PFDs) 102, one or more multifunction displays (MFD) 104, and one or more multi-product avionics control and display units (CDU 106). For instance, in the implementation illustrated in FIG. 1, the integrated avionics system 100 may be configured for use in an aircraft that is flown by one or two pilots (e.g., a pilot and a copilot). In this implementation, the integrated avionics system 100 may include a first PFD 102(1), a second PFD 102(2), an MFD 104, a first CDU 106(1), and a second CDU 106(2), and a third CDU 106(3) that are mounted in the aircraft's instrument panel 108. As shown, the MFD 104 is mounted generally in the center of the instrument panel 108 so that it may be accessed by either pilot (e.g., by either the pilot or the copilot). The first PFD 102(1) and the first CDU 106(1) are mounted in the instrument panel 108 generally to the left of the MFD 104 for viewing and access by the pilot. Similarly, the second PFD 102(2) and the second CDU 106(2) are mounted in the instrument panel 108 generally to the right of the MFD 104 for viewing and access by the aircraft's copilot or other crew member or passenger. The third CDU 106(3) may be mounted between the first and second CDUs 106(1), 106(2). In implementations, the CDUs 106 may be positioned within the instrument panel 108 so that they may be readily viewed and/or accessed by the pilot flying the aircraft (which could be either the pilot or copilot).

The PFDs 102 may be configured to display primary flight information, such as aircraft attitude, altitude, heading, vertical speed, and so forth. In implementations, the PFDs 102 may display primary flight information via a graphical representation of basic flight instruments such as an attitude indicator, an airspeed indicator, an altimeter, a heading indicator, a course deviation indicator, and so forth. The PFDs 102 may also display other information providing situational awareness to the pilot such as terrain information, ground proximity warning information, and so forth.

The primary flight information may be generated by one or more flight sensor data sources including, for example, one or more attitude, heading, angular rate, and/or acceleration information sources such as attitude and heading reference systems (AHRS) 110 such as 110(1) and 110(2), one or more air data information sources such as air data computers (ADCs) 112 such as 112(1) and 112(2), and/or one or more angle of attack information sources. For instance, the AHRSs 110 may be configured to provide information such as attitude, rate of turn, slip and skid; while the ADCs 112 may be configured to provide information including airspeed, altitude, vertical speed, and outside air temperature. Other configurations are possible.

Integrated avionics units (IAUs) may aggregate the primary flight information from the AHRS 110 and ADC 112 and, in one example configuration, provide the information to the PFDs 102 via an avionics data bus 116. In other examples, the various IAUs may directly communicate with each other and other system components. The IAUs may also function as a combined communications and navigation radio. For example, the IAUs may include a two-way VHF communications transceiver, a VHF navigation receiver with glide slope, a global positioning system (GPS) receiver, and so forth. As shown, each integrated avionics unit may be paired with a primary flight display, which may function as a controlling unit for the integrated avionic unit. In implementations, the avionics data bus 116 may comprise a high speed data bus (HSDB), such as data bus complying with ARINC 429 data bus standard promulgated by the Airlines Electronic Engineering Committee (AEEC), a MIL-STD-1553 compliant data bus, and so forth. A radar altimeter may be associated with one or more of the IAUs, such as via data bus 116 or a direct connection, to provide precise elevation information (e.g., height above ground) for autoland functionality. For example, in some configurations, the integrated avionics system 100 includes a radar altimeter to assist an autoland module in various functions of the landing sequence, such as timing and maintaining the level-off and/or flare.

The MFD 104 displays information describing operation of the aircraft such as navigation routes, moving maps, engine gauges, weather radar, ground proximity warning system (GPWS) warnings, traffic collision avoidance system (TCAS) warnings, airport information, and so forth, that are received from a variety of aircraft systems via the avionics data bus 116.

The CDUs 106 may furnish a general purpose pilot interface to control the aircraft's avionics. For example, the CDUs 106 allow the pilots to control various systems of the aircraft such as the aircraft's autopilot system, flight director (FD), electronic stability and protection (ESP) system, autothrottle, navigation systems, communication systems, engines, and so on, via the avionics data bus 116. In implementations, the CDUs 106 may also be used for control of the integrated avionics system 100 including operation of the PFD 102 and MFD 104. In some embodiments, the PFD 102 may be a separate wired or wireless computer or mobile device such as a tablet.

The display 120 displays information to the pilot of the aircraft. In implementations, the display 120 may comprise an LCD (Liquid Crystal Diode) display, a TFT (Thin Film Transistor) LCD display, an LEP (Light Emitting Polymer or PLED (Polymer Light Emitting Diode)) display, a cathode ray tube (CRT), and so forth, capable of displaying text and/or graphical information, such as a graphical user interface. The display 120 may be backlit via a backlight such that it may be viewed in the dark or other low-light environments.

The display 120 may include a touch interface, which can detect a touch input within a specified area of the display 120 for entry of information and commands. In implementations, a touch screen may employ a variety of technologies for detecting touch inputs. For example, the touch screen may employ infrared optical imaging technologies, resistive technologies, capacitive technologies, surface acoustic wave technologies, and so forth. In implementations, buttons, softkeys, keypads, knobs and so forth, may be used for entry of data and commands instead of or in addition to the touch screen.

Figure 3:
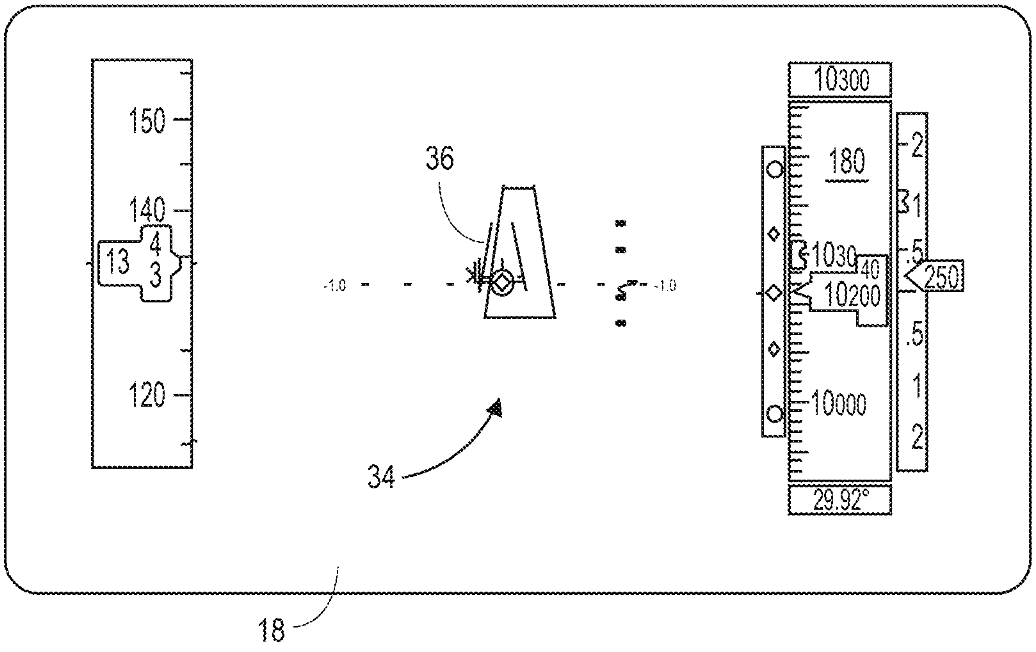
FIG. 3 is a first example screen display generated by the HUD system of FIGS. 1-2.
Figure 4:
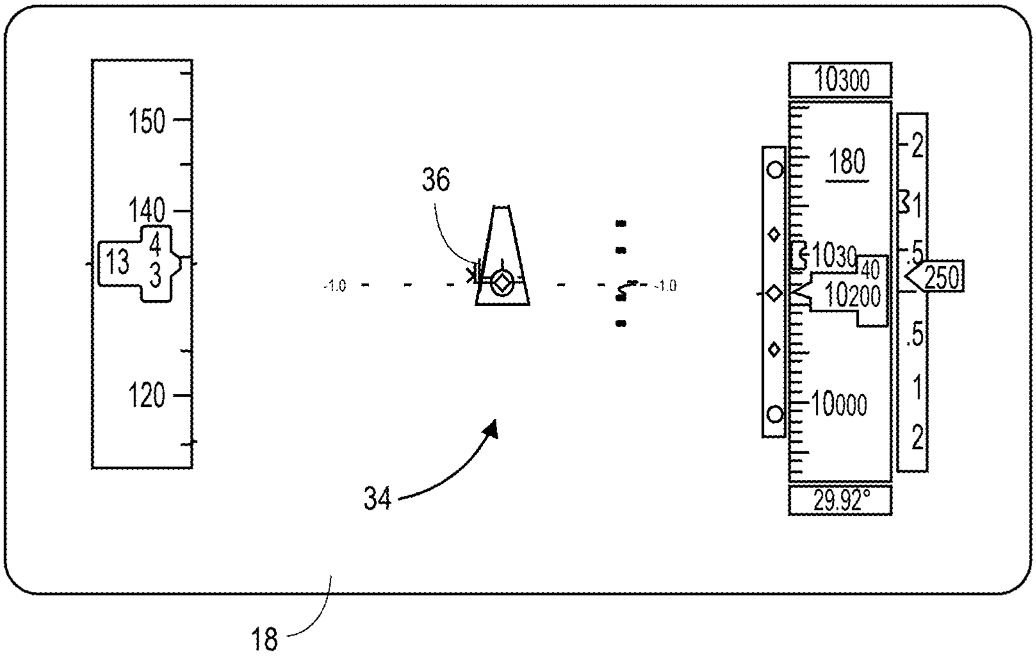
FIG. 4 is a second example screen display generated by the HUD system of FIGS. 1-3.
Figure 7:
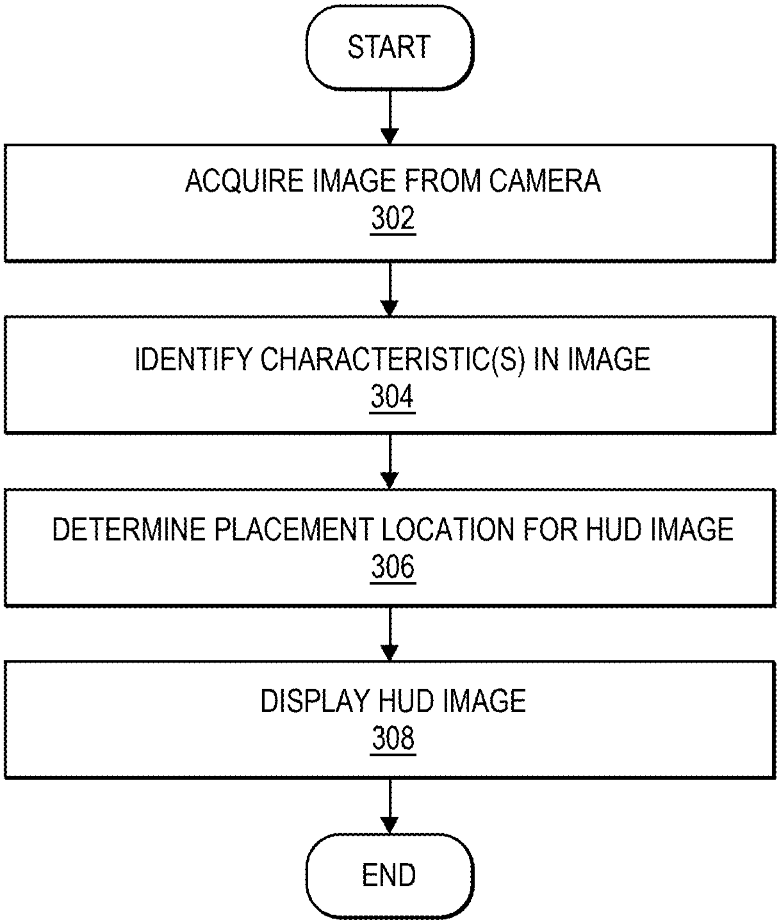
FIG. 7 is a flow diagram of an example process that may be utilized by embodiments of the present invention.

Referring now to FIGS. 3-4 and 7, HUD system 10 may employ the camera 20 to ensure that images displayed by overhead unit 12 properly align with the exterior, real-world, environment of the aircraft. As described in more detail below, the processing system 22 is configured to acquire an external environment image from the camera 20, identify a runway characteristic in the environment image, utilize the runway characteristic to determine a placement location for a HUD image 34; and cause the projector 16 to display the HUD image at the determined placement location. Such functionality, for instance, allows the HUD image 34 to correctly overlay on the pilot's real-world environment, as reflected in the environment image generated by the camera 20, even in situations where the HUD system 10 lacks accurate attitude or heading information for the aircraft to directly correlate the HUD image 34 with the real-world environment based on sensor data alone.

Referring now to FIG. 7, there is shown a flow chart illustrating an example process that can be performed by embodiments of system 10. In step 302, processing system 22 acquires an external environment image from the camera 20. In step 304, processing system 22 identifies a runway characteristic in the environment image. In step 306, processing system 22 utilizes the runway characteristic to determine a placement location for a HUD image. In step 308, processing system 22 causes the projector 16 to display the HUD image at the determined placement location for viewing on combiner 18. Each of these steps will be described in greater detail below.

It should be understood that the steps illustrated in FIG. 7 and described herein can be performed in any suitable order, and are not limited to the specific sequence presented. The steps may be executed sequentially, simultaneously, continuously, or in any combination thereof. For instance, the camera 20 may continuously acquire images for processing by the processing system 22 in step 304, while the processing system 22 determines the placement location for the HUD image at a lower refresh rate. Additionally, some steps may be performed iteratively or in parallel to enhance processing efficiency or to meet specific operational requirements of the device 100. Such variations and modifications in the order and combination of steps fall within the scope of embodiments of the present invention.

In step 302, processing system 22 acquires an external environment image from the camera 20. In examples, the camera 20 may be a forward-facing camera configured to generate forward-looking external images for the aircraft. However, in rotorcraft, urban air mobility, and other configurations, camera 20 may generate external environment images corresponding to any exterior area of the aircraft, including panoramic and the other views described above. The external environment images captured by camera 20 may be transmitted to processing system 22 via communication interfaces 26 and 28, utilizing a data bus such as, I2C, Ethernet, ARINC 429, and the like.

In step 304, processing system 22 identifies a runway characteristic in the environment image. In some variations, processing system 22 may apply image enhancement techniques, such as contrast adjustment or noise reduction, to improve the clarity of the captured image. Additionally, the processing system 22 may filter or preprocess the image to facilitate the identification of the runway characteristic. For instance, the processing system 22 can apply noise reduction algorithms, such as Gaussian or median filtering, to minimize random variations or distortions in the image that could interfere with accurate interpretation. Contrast enhancement techniques, like histogram equalization, may also be used to adjust the brightness and contrast of the image, making key features such as the runway characteristic, more distinguishable. In certain embodiments, the system may acquire multiple frames of the external environment to create a composite or averaged image for more accurate analysis.

Processing system 22 can utilize various computer vision, machine learning, and related techniques to identify features within the environment image, including the runway characteristic. For instance, processing system 22 may use object detection, image segmentation, edge detection, pattern recognition, and/or feature extraction techniques to filter and identify relevant elements within the environment image, such as runway thresholds, runway boundaries, runway edges, approach lighting, taxiways, intersections, and the like. Additionally, the processing system 22 may apply geometric modeling to assess the spatial relationships between identified objects. For instance, utilizing runway and airport information stored within a database of processing system 22 or integrated avionics system 100, processing system 22 may utilize knowledge of the runway dimensions, such as width and length, to verify that it can correctly identify features within the environment image. Similarly, such fixed runway and airport knowledge from the database can be used to assist the computer vision techniques employed by the processing system 22 in identifying features, such as runway edges and runway thresholds.

In examples where the runway characteristic is the edges of the runway, processing system 22 may employ edge detection algorithms to quickly and accurately identify runway edges in a variety of lighting and environmental conditions. These algorithms may include techniques such as the Canny edge detector, which uses gradient-based methods to detect edges while minimizing noise, or the Sobel operator, which calculates intensity gradients in the image to highlight significant edge features. In some embodiments, adaptive thresholding may be applied to adjust for varying lighting conditions, ensuring that runway edges are accurately detected even in low visibility or high-contrast environments.

Processing system 22 can utilize position, heading, and attitude information provided by the integrated avionics system 100 to assist in identifying runway characteristics within the environment image. By incorporating real-time data from the aircraft's GPS, inertial measurement units (IMUs), and other navigation sensors, processing system 22 can more accurately predict the location and orientation of the runway in the external environment. For instance, knowing the aircraft's precise heading and position relative to the runway can help narrow down the area within the environment image where runway edges, thresholds, or approach lighting are likely to appear. The attitude information, such as pitch and roll, can further refine the search by adjusting for the angle at which the camera 20 captures the external view, ensuring that the runway features are identified correctly despite changes in the aircraft's orientation.

Although runway characteristics are described above, in some configurations processing system 22 may identify and utilize any environment characteristics, including approach lighting, VASI lights, taxiways, intersections, airport terminals, terrain features, and the like. Additionally, the processing system 22 can vary which characteristics are identified and utilized depending on particular scenarios and flight configurations. For instance, if runway edges cannot be identified, the processing system 22 may revert to other features such as runway thresholds or the like to align the HUD image in step 306.

In addition to or as an alternative to identifying runway characteristics, processing system 22 may utilize terrain features and other data from various sources to identify and align environmental characteristics. For instance, data from a digital elevation database can provide detailed topographical information, allowing the system to identify terrain features such as mountains, valleys, or hills. This data can be supplemented with object data from three-dimensional map content, which may include buildings, trees, and other man-made structures. Synthetic vision data, generated by combining elevation and object databases with real-time positioning information, can further enhance the system's ability to detect and identify relevant environment characteristics, such as obstacles or terrain contours. By cross-referencing this data with the external environment image captured by the camera 20, the system can ensure that the HUD image aligns accurately with the pilot's real-world view. Such functionality can be useful to align the HUD image in situations where the runway is not visible or in situations not involving landing or takeoff.

In step 306, processing system 22 utilizes the runway characteristic to determine a placement location for a HUD image 34. Processing system 22 may use any number or combination of the runway characteristics identified in step 304 to determine a placement location for the HUD image 34. The HUD image 34 may include one or more graphic elements for projection by HUD projector 16 for display by combiner 18. In some examples, the HUD image 34 includes one or more pictograms 36, such as runway pictogram, an airspeed pictogram, and altitude pictogram, a flight path marker pictogram, instrument landing pictograms, combinations thereof, and the like.

As it's useful for the HUD image 34 to be accurately overlaid on the real-world view seen by the pilot by looking through combiner 18, processing system 22 can adjust the placement location of the HUD image 34, based on the image from the camera 20, to ensure that the HUD image 34 properly aligns with the real-world view captured by the camera 20 and seen by the pilot. After identifying runway characteristics, such as edges or thresholds, processing system 22 uses these reference points to calculate the exact spatial coordinates of the runway within the external environment. The system then adjusts the position, scale, and orientation of HUD image 34 to match these coordinates, ensuring that the projected visual information, such as the runway pictogram, aligns precisely with the real-world runway.

In configurations where HUD image 34 includes a runway pictogram, processing system 22 may position the runway pictogram within HUD image 34 to ensure its edges align with the real-world runway edges seen by the pilot through combiner 18. After identifying the runway edges in the external environment image captured by camera 20, processing system 22 adjusts the placement and scale of the runway pictogram so that its edges precisely match the detected runway edges. This alignment ensures that the runway pictogram visually overlays the real runway as seen by the pilot. After alignment of the runway pictogram, processing system 22 may position other pictograms, such as airspeed and altitude pictograms, based on the positioning of the runway pictogram to ensure that the entire HUD image 34 is properly viewable.

The overhead unit 12 may include a pilot-facing camera equipped with gaze detection, face detection, or similar technologies to determine the pilot's viewpoint through the combiner 18. By tracking the pilot's head and eye position, the system can identify the exact line of sight, allowing for dynamic adjustments to HUD image 34 to ensure that it aligns with the pilot's real-world view. This additional data enables processing system 22 to adjust the placement, size, and orientation of the HUD image based not only on the external environment image generated by camera 20, but also on the pilot's specific viewing angle.

To facilitate accurate alignment between the HUD image 34 and the external environment image, a common coordinate system can be used for both. This coordinate system allows processing system 22 to compare the positions of identified runway characteristics in the external environment image with the corresponding elements in the HUD image 34, such as the runway pictogram 36. By mapping the real-world features detected in the environment image to the same coordinate framework as the HUD display, processing system 22 can identify any discrepancies between the two. Based on this comparison, the system can determine the adjustments needed in terms of position, scale, or orientation of the HUD image to ensure that it remains properly aligned with the external view seen through the combiner 18.

FIG. 3 illustrates an example pilot's view of a scene through combiner 18 including HUD image 34 with runway pictogram 36. In the example of FIG. 3, runway pictogram 36 is misaligned with the visible runway, perhaps due to compass or heading errors. In the example of FIG. 4, the same example scene is illustrated, but now with the HUD image 34 being adjusted by processing system 22 so that the runway pictogram 36 properly aligns with the actual runway viewed by the pilot through the combiner 18.

Even when potential errors exist in the data provided by the integrated avionics system 100, such as drift in position or heading information, processing system 22 can still accurately determine the placement location for HUD image 34 and associated pictograms 36. This enables the system 10 to compensate for inaccuracies in the sensor data and be employed even without high-precision equipment such as AHRS, laser ring gyros, or advanced inertial navigation systems.

In step 308, processing system 22 causes the projector 16 to display the HUD image 34 at the determined placement location for viewing on combiner 18. Processing system 22 may send this signal via communication interface 28 to projector 16, which can interpret the data and prepare the visual representation for projection. Projector 16 may use its optical components to project the generated HUD image 34 onto combiner 18, where the HUD image 34, and/or portions thereof such runway pictogram 36, can be overlaid on the pilot's real-world view. The projection may be continuously adjusted in real time to account for any changes in the aircraft's position, heading, and/or attitude based on images generated by camera 20, ensuring that the HUD image 34 remains accurately aligned with the environment.

The HUD image 34 generated by processing system 22 may be a vector-based image, allowing for scalable, high-resolution graphics that can be adjusted in size and orientation without loss of clarity. This vector image may be stored or transmitted in standard formats such as Scalable Vector Graphics (SVG) or a proprietary format optimized for real-time rendering within the HUD system. The use of vector graphics enables precise control over individual elements, such as the runway pictogram, ensuring that these elements can be dynamically resized and repositioned to align with real-world features. The vector format also allows for efficient data transmission from processing system 22 to projector 16, as it conveys image data using mathematical instructions rather than pixel-by-pixel information, reducing bandwidth requirements and ensuring quick rendering on the combiner 18. However, HUD image 34 may be represented in any format suitable for display. Additionally, each pictogram 36 may be represented as an independent image, each separately transmitted by processing system 22 to overhead unit 12. That is, overhead unit 12 may be capable of displaying more than one HUD image 34 at a time and processing system 22 can be configured to determine placement locations for each of the HUD images, and each of their respective pictograms, based on the external environment images provided by camera 20.

Steps 302-308 may be repeated continuously throughout the flight to ensure the HUD image 34 remains accurately aligned with the real-world environment as the aircraft's position, altitude, and heading change. Processing system 22 may be configured to receive a stream of images from camera 20, continuously identifying the runway characteristic within each image of the stream. Based on the identified runway characteristics, processing system 22 may determine the appropriate placement location for HUD image 34. The system may then continuously adjust the placement of HUD image 34 and cause projector 16 to display the image at the determined location on combiner 18. For example, during the approach phase, processing system 22 may continuously acquire updated external environment images from camera 20, re-identify runway edges or other key features, and adjust the placement of the runway pictogram accordingly. Variations of this process may include different phases of flight, such as takeoff or taxiing, where the HUD system could identify other elements like taxiway edges or runway intersections. In certain embodiments, additional sensors, databases, and the like may be integrated to further refine the alignment of HUD image 34 based on real-time aircraft movement.

In certain embodiments, the alignment data derived from the misalignment between the virtual scene displayed by the HUD system 10 and the real-world view indicated by camera 20 may be utilized to enhance the calibration of the integrated avionics system 100, particularly the Attitude and Heading Reference System (AHRS) 110. By feeding this misalignment information into the AHRS algorithm, the system 100 can improve its estimates of heading, pitch, and roll. Incorporating misalignment data can provide an additional correction factor for the aircraft's sensors, particularly for heading. This is especially beneficial in regions where magnetic anomalies exist, such as polar areas, where low-cost AHRS systems often struggle to maintain accuracy.

In certain configurations, the alignment information derived from the camera 20 may also be utilized to calibrate gyro bias errors in the AHRS 110, particularly when the aircraft is stationary on the ground. For instance, when camera 20 detects that the external scene is not changing, indicating that the aircraft is stationary, processing system 22 or components of integrated avionics system 100 can utilize this data to verify that the gyroscopes within the AHRS 110 are correctly reading a zero rate of rotation. If the gyroscopes are not reading zero when the external environment captured by camera 20 is unchanged, processing system 22 or components of integrated avionics system 100 can identify a gyro bias error and apply a correction to null out that error. This correction allows the system to maintain more accurate heading estimates under stationary conditions, particularly when the aircraft is located in areas of magnetic anomalies.

In certain embodiments, the camera 20 can be utilized to augment the autopilot system and other flight operations. For example, processing system 22 and/or components of integrated avionics system 100 could use the camera's detection of runway edges, combined with stored knowledge of runway dimensions such as length and width, to determine the aircraft's position on the glideslope during an approach. By analyzing the trapezoidal shape of the runway as captured in the camera image, processing system 22 22 and/or components of integrated avionics system 100 can correlate the image to a specific 3D point in space. This technique could be particularly useful in scenarios where GPS signals are unreliable, such as during a GPS-jamming event on an RNAV approach, or in situations where an aircraft is executing an emergency Autoland or Smart Glide procedure to an airport without a precision approach. In such scenarios, the camera-based system could provide an alternative method for determining the aircraft's position relative to the glideslope.

Additionally, camera 20 may be used to detect taxiway or runway centerlines, allowing processing system 22 and/or components of integrated avionics system 100 to assist the autopilot in tracking those lines. This capability could improve the precision of runway centerline landings during emergency Autoland procedures and allow the system to automatically follow taxiway centerlines. Furthermore, in certain configurations, artificial intelligence (AI) or machine vision algorithms integrated into processing system 22 and/or components of integrated avionics system 100 could be used to detect obstacles in the runway environment, such as other aircraft. This functionality could prompt an automatic go-around if another aircraft is detected on the landing runway or apply the brakes if a taxiing aircraft is detected entering an active runway. Finally, the camera 20 may also assist in flaring the aircraft during an auto-land procedure, potentially replacing or augmenting the radar altimeter by providing more precise height-above-ground and pitch attitude data for a smoother flare maneuver.

Having thus described various embodiments, what is claimed as new and desired to be protected by Letters Patent includes the following:

The invention claimed is:

1. A heads-up display (HUD) system configured for use in an aircraft, the HUD system comprising:
- an overhead unit configured for mounting to the aircraft, the overhead unit including:
  - a combiner;
  - a projector; and
  - a camera operable to generate a forward-looking environment image external to the aircraft; and
- a HUD computer coupled with the overhead unit, the HUD computer comprising a processing system operable to:
  - acquire the external environment image from the camera;
  - identify a runway characteristic in the environment image, the identified runway characteristic including detected first and second edges of a runway found depicted in the external environment image;
  - utilize the detected first and second edges of the depicted runway to determine a placement location for a runway pictogram in a HUD image by:
    - determining, based on the identified runway characteristic, spatial coordinates of the runway in the external environment;
    - mapping the detected first and second edges of the runway and corresponding first and second edges of the runway pictogram to a common coordinate system;
    - comparing, in the common coordinate system, the detected first and second edges of the runway with the corresponding first and second edges of the runway pictogram to identify a discrepancy therebetween; and
    - adjusting at least one of a position, a scale, or an orientation of the runway pictogram based on the identified discrepancy such that the corresponding first and second edges of the runway pictogram match the spatial coordinates of the detected first and second edges of the runway in the external environment; and
  - cause the projector to project the HUD image including the runway pictogram at the determined placement location relative to the external environment,
- wherein the projector projects the HUD image onto the combiner, and the combiner presents the HUD image overlaid on a real-world view of the external environment and positioned such that the corresponding first and second edges of the runway pictogram align with the respective first and second edges of the runway in the external environment when viewed through the combiner; and
- wherein the combiner is selectively positionable into a forward field of view.

2. The HUD system of claim 1, wherein the overhead unit and the HUD computer are integrated within a common housing.

3. The HUD system of claim 1, wherein the overhead unit and the HUD computer are positioned within discrete housings.

4. The HUD system of claim 1, wherein the HUD computer includes a communication interface configured to receive attitude and heading information from an attitude and heading reference system.

5. The HUD system of claim 1, wherein the processing system is configured to receive a stream of images from the camera, identify the runway characteristic within each of the stream of images, determine the placement location for the HUD image based the identified runway characteristics, and continuously cause the projector to project the HUD image at the determined placement location.

6. The HUD system of claim 1, wherein the processing system is configured to identify a plurality of runway characteristics in the environment image and utilize the runway characteristics to determine a placement location for the HUD image.

7. The HUD system of claim 1, wherein the HUD image includes a plurality of pictograms and the processing system is configured to utilize the plurality of runway characteristics to determine placement locations for the pictograms.

* * * * *